United States Patent
Shoki

(10) Patent No.: US 7,564,594 B2
(45) Date of Patent: Jul. 21, 2009

(54) DIGITAL MULTIFUNCTIONAL IMAGING APPARATUS

(75) Inventor: Mikio Shoki, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 627 days.

(21) Appl. No.: 11/125,211

(22) Filed: May 10, 2005

(65) Prior Publication Data

US 2005/0259275 A1 Nov. 24, 2005

(30) Foreign Application Priority Data

May 10, 2004 (JP) .............................. 2004-140454

(51) Int. Cl.
*H04N 1/393* (2006.01)

(52) U.S. Cl. ...................... 358/451; 358/1.2; 345/667; 345/668; 345/669; 345/670; 345/671; 382/298; 382/299

(58) Field of Classification Search ................ 358/500, 358/528, 537, 1.1, 1.2, 1.16, 451; 382/298, 382/299; 345/667, 668, 669, 670, 671

See application file for complete search history.

(56) References Cited

U.S. PATENT DOCUMENTS

| 5,519,498 | A | 5/1996 | Matsumoto | |
|---|---|---|---|---|
| 6,175,660 | B1 * | 1/2001 | Nabeshima et al. | 382/274 |
| 6,389,180 | B1 * | 5/2002 | Wakisawa et al. | 382/298 |
| 6,567,102 | B2 * | 5/2003 | Kung | 345/660 |
| 6,674,920 | B1 * | 1/2004 | Ishikawa | 382/298 |
| 7,003,176 | B1 * | 2/2006 | Suzuki et al. | 382/299 |
| 7,397,972 | B2 * | 7/2008 | Shimizu et al. | 382/300 |
| 2001/0050782 | A1 * | 12/2001 | Niitsuma et al. | 358/1.15 |
| 2003/0095723 | A1 * | 5/2003 | Ishizaka et al. | 382/298 |
| 2003/0179953 | A1 * | 9/2003 | Ishizaka | 382/298 |
| 2004/0042681 | A1 * | 3/2004 | Takano et al. | 382/274 |
| 2004/0201863 | A1 * | 10/2004 | Bailey et al. | 358/1.2 |

FOREIGN PATENT DOCUMENTS

JP 02-243060 9/1990
JP 3-58284 A 3/1991

(Continued)

OTHER PUBLICATIONS

Japanese Office Action dated Jul. 17, 2007 with English translation (Four (4) pages).

*Primary Examiner*—Edward L Coles
*Assistant Examiner*—Kent Yip
(74) *Attorney, Agent, or Firm*—Crowell & Moring LLP

(57) ABSTRACT

In a digital multifunctional apparatus, enlargement/reduction parameters for respective pixels are calculated by an image processing circuit multiplying a length enlargement/reduction ration output from a CPU by pixel numbers of an image read by an image sensor, in which the pixel numbers are counted form a starting pixel of the image reading. A pixel counter counts integer portion C of each enlargement/reduction parameter. When the integer portion C of the calculated enlargement parameter of a respective pixel increases by at least two from that of the preceding pixel, a pixel supplement circuit supplements one image data to enlarge the image data. When the counted integer portion C of the calculated reduction parameter of a respective pixel is unchanged form that of the preceding pixel, the image processing circuit removes the image data of the respective pixel to reduce the image data.

2 Claims, 4 Drawing Sheets

FOREIGN PATENT DOCUMENTS

| | | |
|---|---|---|
| JP | 04-222067 | 8/1992 |
| JP | 6-98152 A | 4/1994 |
| JP | 07-162675 | 6/1995 |
| JP | 08-023440 | 1/1996 |
| JP | 2000-125118 | 4/2000 |

* cited by examiner

FIG. 3

| MAG | $E_{APE}$ | $E_{LEN}$ | ENLARGEMENT PARAMETERS | | | | | | | |
|---|---|---|---|---|---|---|---|---|---|---|
| | | | 1st PIXEL | 2nd PIXEL | 3rd PIXEL | 4th PIXEL | 5th PIXEL | 6th PIXEL | 7th PIXEL | 8th PIXEL |
| 256 | 2.56 | 1.6 | 1.6 | 3.2 | 4.8 | 6.4 | 8 | 9.6 | 11.2 | 12.8 |
| 257 | 2.57 | 1.603122 | 1.603030 | 3.206061 | 4.809091 | 6.412121 | 8.015152 | 9.618182 | 11.221212 | 12.824242 |
| 258 | 2.58 | 1.606238 | 1.606061 | 3.212121 | 4.818182 | 6.424242 | 8.030303 | 9.636364 | 11.242424 | 12.848485 |
| 259 | 2.59 | 1.609348 | 1.609091 | 3.218182 | 4.827273 | 6.436364 | 8.045455 | 9.654545 | 11.263636 | 12.872727 |
| 260 | 2.6 | 1.612452 | 1.612121 | 3.224242 | 4.836364 | 6.448485 | 8.060606 | 9.672727 | 11.284848 | 12.89697 |
| 261 | 2.61 | 1.615549 | 1.615152 | 3.230303 | 4.845455 | 6.460606 | 8.075758 | 9.690909 | 11.306061 | 12.921212 |
| 262 | 2.62 | 1.618641 | 1.618182 | 3.236364 | 4.854545 | 6.472727 | 8.090909 | 9.709091 | 11.327273 | 12.945455 |
| 263 | 2.63 | 1.621727 | 1.621212 | 3.242424 | 4.863636 | 6.484848 | 8.106061 | 9.727273 | 11.348485 | 12.969697 |
| 264 | 2.64 | 1.624808 | 1.624242 | 3.248485 | 4.872727 | 6.49697 | 8.121212 | 9.745455 | 11.369697 | 12.993939 |
| 265 | 2.65 | 1.627882 | 1.627273 | 3.254545 | 4.881818 | 6.509091 | 8.136364 | 9.763636 | 11.390909 | 13.018182 |
| 266 | 2.66 | 1.630951 | 1.630303 | 3.260606 | 4.890909 | 6.521212 | 8.151515 | 9.781818 | 11.412121 | 13.042424 |
| 267 | 2.67 | 1.634013 | 1.633333 | 3.266667 | 4.9 | 6.533333 | 8.166667 | 9.8 | 11.433333 | 13.066667 |
| 268 | 2.68 | 1.637071 | 1.636364 | 3.272727 | 4.909091 | 6.545455 | 8.181818 | 9.818182 | 11.454545 | 13.090909 |
| 269 | 2.69 | 1.640122 | 1.639394 | 3.278788 | 4.918182 | 6.557576 | 8.19697 | 9.836364 | 11.475758 | 13.115152 |
| 270 | 2.7 | 1.643168 | 1.642424 | 3.284848 | 4.927273 | 6.569697 | 8.212121 | 9.854545 | 11.49697 | 13.139394 |
| 271 | 2.71 | 1.646208 | 1.645455 | 3.290909 | 4.936364 | 6.581818 | 8.227273 | 9.872727 | 11.518182 | 13.163636 |
| 272 | 2.72 | 1.649242 | 1.648485 | 3.29697 | 4.945455 | 6.59394 | 8.242424 | 9.890909 | 11.539394 | 13.187879 |
| 273 | 2.73 | 1.652271 | 1.651515 | 3.30303 | 4.954545 | 6.606061 | 8.257576 | 9.909091 | 11.560606 | 13.212121 |
| 274 | 2.74 | 1.655295 | 1.654545 | 3.309091 | 4.963636 | 6.618182 | 8.272727 | 9.927273 | 11.581818 | 13.236364 |
| 275 | 2.75 | 1.658312 | 1.657576 | 3.315152 | 4.972727 | 6.630303 | 8.287879 | 9.945455 | 11.60303 | 13.260606 |
| 276 | 2.76 | 1.661325 | 1.660606 | 3.321212 | 4.981818 | 6.642424 | 8.30303 | 9.963636 | 11.624242 | 13.284848 |
| 277 | 2.77 | 1.664332 | 1.663636 | 3.327273 | 4.990909 | 6.654545 | 8.318182 | 9.981818 | 11.645455 | 13.309091 |
| 278 | 2.78 | 1.667333 | 1.666667 | 3.333333 | 5 | 6.666667 | 8.333333 | 10 | 11.666667 | 13.333333 |
| 279 | 2.79 | 1.670329 | 1.669697 | 3.339394 | 5.009091 | 6.678788 | 8.348485 | 10.018182 | 11.687879 | 13.357576 |
| 280 | 2.8 | 1.673320 | 1.672727 | 3.345455 | 5.018182 | 6.690909 | 8.363636 | 10.036364 | 11.709091 | 13.381818 |
| 281 | 2.81 | 1.676305 | 1.675758 | 3.351515 | 5.027273 | 6.703030 | 8.378788 | 10.054545 | 11.730303 | 13.406061 |
| 282 | 2.82 | 1.679286 | 1.678788 | 3.357576 | 5.036364 | 6.715152 | 8.393939 | 10.072727 | 11.751515 | 13.430303 |
| 283 | 2.83 | 1.682260 | 1.681818 | 3.363636 | 5.045455 | 6.727273 | 8.409091 | 10.090909 | 11.772727 | 13.454545 |
| 284 | 2.84 | 1.685230 | 1.684848 | 3.369697 | 5.054545 | 6.739394 | 8.424242 | 10.109091 | 11.793939 | 13.478788 |
| 285 | 2.85 | 1.688194 | 1.687879 | 3.375758 | 5.063636 | 6.751515 | 8.439394 | 10.127273 | 11.815152 | 13.50303 |
| 286 | 2.86 | 1.691153 | 1.690909 | 3.381818 | 5.072727 | 6.763636 | 8.454545 | 10.145455 | 11.836364 | 13.527273 |
| 287 | 2.87 | 1.694107 | 1.693939 | 3.387879 | 5.081818 | 6.775758 | 8.469697 | 10.163636 | 11.857576 | 13.551515 |
| 288 | 2.88 | 1.697056 | 1.69697 | 3.393939 | 5.090909 | 6.787879 | 8.484848 | 10.181818 | 11.878788 | 13.575758 |
| 289 | 2.89 | | 1.7 | 3.4 | 5.1 | 6.8 | 8.5 | 10.2 | 11.9 | 13.6 |

FIG. 4

| RED | $R_{ARE}$ | $R_{LEN}$ | REDUCTION PARAMETERS ||||| 
|---|---|---|---|---|---|---|---|
| | | | 1st PIXEL | 2nd PIXEL | 3rd PIXEL | 4th PIXEL | 5th PIXEL |
| 25 | 0.25 | 0.5 | 0.5 | 1 | 1.5 | 2 | 2.5 |
| 26 | 0.26 | 0.509902 | 0.509091 | 1.018182 | 1.527273 | 2.036364 | 2.545455 |
| 27 | 0.27 | 0.519615 | 0.518182 | 1.036364 | 1.554546 | 2.072728 | 2.59091 |
| 28 | 0.28 | 0.529150 | 0.527273 | 1.054546 | 1.581819 | 2.109092 | 2.636365 |
| 29 | 0.29 | 0.538516 | 0.536364 | 1.072728 | 1.609092 | 2.145456 | 2.68182 |
| 30 | 0.3 | 0.547723 | 0.545455 | 1.09091 | 1.636365 | 2.18182 | 2.727275 |
| 31 | 0.31 | 0.556776 | 0.554545 | 1.10909 | 1.663635 | 2.21818 | 2.772725 |
| 32 | 0.32 | 0.565685 | 0.563636 | 1.127272 | 1.690908 | 2.254544 | 2.81818 |
| 33 | 0.33 | 0.574456 | 0.572727 | 1.145454 | 1.718181 | 2.290908 | 2.863635 |
| 34 | 0.34 | 0.583095 | 0.581818 | 1.163636 | 1.745454 | 2.327272 | 2.90909 |
| 35 | 0.35 | 0.591608 | 0.590909 | 1.181818 | 1.772727 | 2.363636 | 2.954545 |
| 36 | 0.36 | 0.6 | 0.6 | 1.2 | 1.8 | 2.4 | 3 |
| 37 | 0.37 | 0.608276 | 0.607692 | 1.215384 | 1.823076 | 2.430768 | 3.03846 |
| 38 | 0.38 | 0.616441 | 0.615385 | 1.23077 | 1.846155 | 2.46154 | 3.076925 |
| 39 | 0.39 | 0.624500 | 0.623077 | 1.246154 | 1.869231 | 2.492308 | 3.115385 |
| 40 | 0.4 | 0.632456 | 0.630769 | 1.261538 | 1.892307 | 2.523076 | 3.153845 |
| 41 | 0.41 | 0.640312 | 0.638462 | 1.276924 | 1.915386 | 2.553848 | 3.19231 |
| 42 | 0.42 | 0.648074 | 0.646154 | 1.292308 | 1.938462 | 2.584616 | 3.23077 |
| 43 | 0.43 | 0.655744 | 0.653846 | 1.307692 | 1.961538 | 2.615384 | 3.26923 |
| 44 | 0.44 | 0.663325 | 0.661538 | 1.323076 | 1.984614 | 2.646152 | 3.30769 |
| 45 | 0.45 | 0.670820 | 0.669231 | 1.338462 | 2.007693 | 2.676924 | 3.346155 |
| 46 | 0.46 | 0.678233 | 0.676923 | 1.353846 | 2.030769 | 2.707692 | 3.384615 |
| 47 | 0.47 | 0.685565 | 0.6846615 | 1.369323 | 2.0539845 | 2.738646 | 3.4233075 |
| 48 | 0.48 | 0.692820 | 0.692308 | 1.384616 | 2.076924 | 2.769232 | 3.46154 |
| 49 | 0.49 | 0.7 | 0.7 | 1.4 | 2.1 | 2.8 | 3.5 |

DIGITAL MULTIFUNCTIONAL IMAGING APPARATUS

BACKGROUND OF THE INVENTION

1. Field of the Invention

The present invention relates to a digital multifunctional imaging apparatus (hereafter referred to simply as "digital multifunctional apparatus") which has a printing function and a scanning function, and is capable of copying a document by itself without being connected to an apparatus having a host function such as a personal computer.

2. Description of the Related Art

A digital multifunctional apparatus has an image processing function of enlarging or reducing an image based on image data read by an image sensor (scanner unit) in order to adjust the image based on the image data to, for example, a size of a printing paper. When a host apparatus such as a personal computer is connected to the digital multifunctional apparatus, such image processing can be easily performed with using a CPU (Central Processing Unit) in the host apparatus. On the other hand, in the case of a digital multifunctional apparatus of so-called stand-alone type that can copy a document independently, three CPUs are used for scan control, print control and entire control of the digital multifunctional apparatus, respectively, while one DSP (Digital Signal Processor) is used for image processing, in order to perform the copy process without being connected to a host apparatus, or without starting the host apparatus.

Meanwhile, an image processing apparatus in a video printer is known for producing a hard copy of a television image (refer to, for example, Japanese Laid-open Patent Publication Hei 8-23440). Also known is an image processing apparatus for converting image data output from a facsimile so as to adjust the image data to the resolution of a printer (refer to, for example, Japanese Laid-open Patent Publication Hei 4-222067). It is also known to enlarge or reduce an image using a CPU installed in a printer apparatus (refer to, for example, Japanese Laid-open Patent Publication Hei 7-162675). Furthermore, an image magnification apparatus is known which reduces or enlarges an image by partially removing an image output. clock signal, or by exchanging an image output clock signal for an image input signal (refer to, for example, Japanese Laid-open Patent Publication 2000-125118 and Japanese Laid-open Patent Publication Hei 2-243060).

However, the above-mentioned conventional digital multifunctional apparatus is configured to process images through a firmware using the DSP, so that the processing speed depends on the operating frequencies of the CPUs and the DSP in the digital multifunctional apparatus, in which the DSP operates in synchronization with the CPUs. Thus, in order to complete the image processing and start printing operation in a short time, it is necessary to increase the frequencies of the operating clock of the CPUs and the DSP in the digital multifunctional apparatus. For example, the frequency of the operating clock of the three CPUs is required to be about 100 MHz, while the frequency of the operating clock of the DSP is required to be about 200 MHz. Accordingly, it is needed to use many such CPUs and DSP, which are expensive and thus remain an obstacle to cost reduction.

This problem cannot be solved by using the technology disclosed in either one of the first three patent publications described above. On the other hand, the image magnification apparatus disclosed in either one of the last two patent publications described above requires a complex circuit configuration to partially remove an image output clock signal, or to exchange an image output clock signal for an image input signal, thereby increasing the manufacturing cost.

SUMMARY OF THE INVENTION

An object of the present invention is to provide such a digital multifunctional apparatus that can quickly enlarge or reduce an image based on image data without using a CPU and a DSP having high operating clock frequencies so as to achieve cost reduction.

A digital multifunctional imaging apparatus capable of copying a document independently in accordance with an aspect of the present invention comprises: an image sensor for irradiating light onto a document and receiving light reflected from the document so as to read image data of the document; an image processor for processing the image data read by the image sensor so as to enlarge or reduce an image; a printing mechanism for printing an image with using the image data processed by the image processor; a CPU (Central Processing Unit) for controlling the image sensor, the image processor and the printing mechanism; and a memory memorizing operating programs of the CPU. The image processing means is configured by a hardware circuit. While reading the image data of the document, the image processor quickly processes the read image data for enlarging or reducing an image to be printed without increasing burden of the control means.

By such a configuration, the image processor is configured by a hardware circuit, so that it is possible that while reading the image data of a document, the image processor quickly processes the read image data for enlarging or reducing an image to be printed without increasing the burden of the control means. Thus, it is possible to use an inexpensive processor having a low operating clock frequency for the control means, while reducing time required from reading of a document to printing, thereby making it possible to reduce the cost of the digital multifunctional apparatus.

For enlarging the image, it is possible that the image processor calculates enlargement parameters for respective pixels or respective lines from a length enlargement ratio designated by a user and pixel numbers or line numbers of an image read by the image sensor, in which the pixel numbers or the line numbers are counted from a starting pixel or a starting line of the image reading, and supplements one image data between a respective pixel and the preceding pixel or between a respective line and the preceding line on the basis of the calculated enlargement parameter for the respective pixel or the respective line, so as to enlarge the image data.

For reducing the image, it is possible that the image processing means calculates reduction parameters for respective pixels or respective lines from a length reduction ratio designated by a user and pixel numbers or line numbers of an image read by the image sensor, in which the pixel numbers or the line numbers are counted from a starting pixel or a starting line of the image reading, and removes image data on the basis of the calculated reduction parameter for the respective pixel or the respective line, so as to reduce the image data.

BRIEF DESCRIPTION OF THE DRAWINGS

FIG. 3 is a conversion table showing examples of enlargement parameters used as references for enlarging image data; and FIG. 4 is a conversion table showing examples of reduction parameters used as references for reducing image data.

DESCRIPTION OF THE PREFERRED EMBODIMENTS

A preferred embodiment in accordance with the present invention will be described with reference to the drawings.

Figure 1:
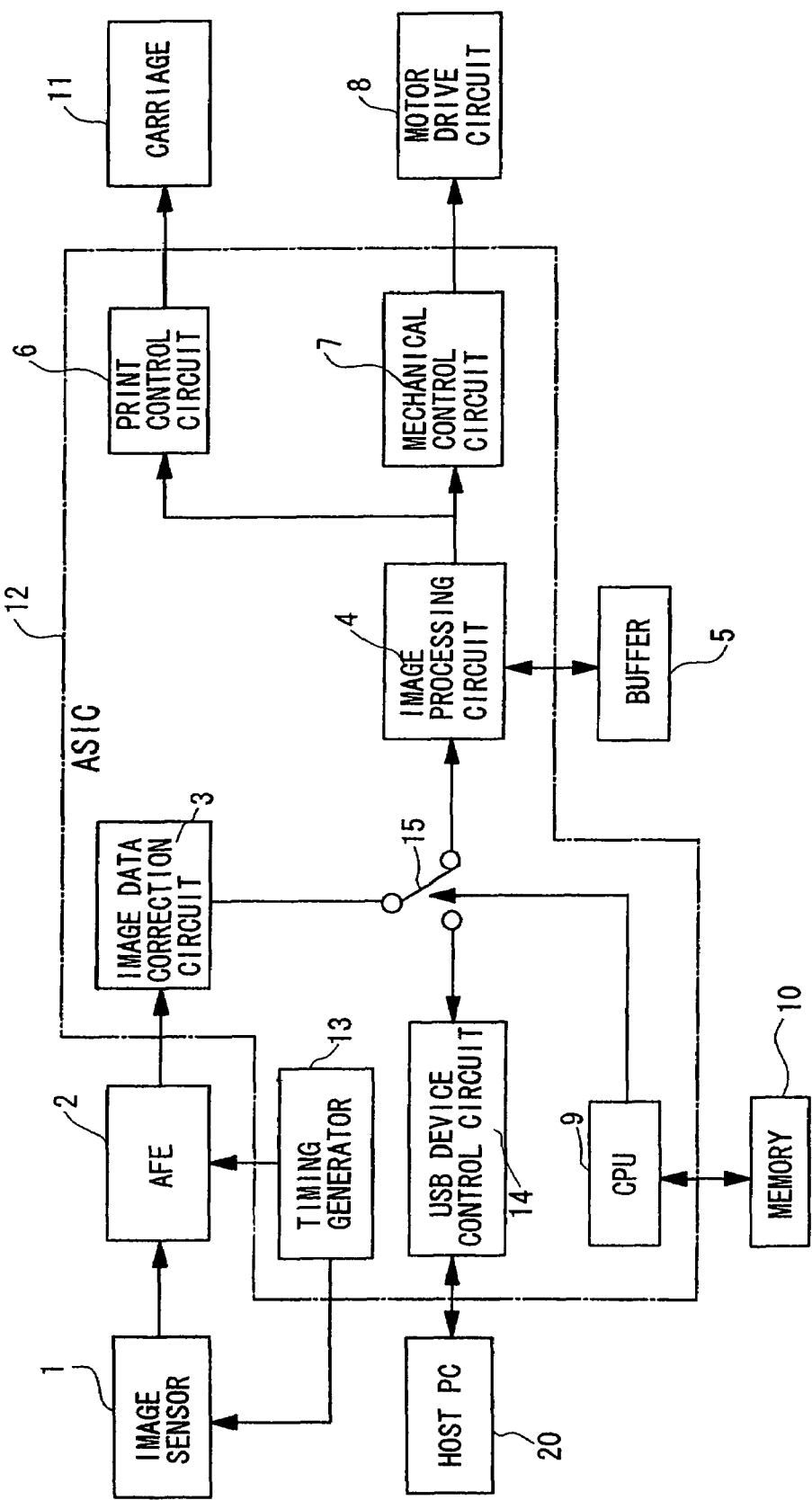
FIG. 1 is a block diagram showing a configuration of a digital multifunctional apparatus in accordance with an embodiment of the present invention.

FIG. 1 shows a schematic block diagram of a digital multifunctional apparatus having an inkjet printer mechanism in accordance with the embodiment. The digital multifunctional apparatus comprises: an image sensor 1 for reading image data of a document and converting the read image data into analog electric signals; an analog front-end circuit (AFE) 2 for converting the analog electric signals of the image data read by the image sensor 1 into digital electric signals; image data correction circuit 3 for correcting the image data output from the AFE 2, if necessary; an image processing circuit (serving as an image processing means) 4 for enlarging or reducing the image data outputted from the image data correction circuit 3; a buffer (serving as a buffer means) 5 for temporarily memorizing the image data processed by the image processing circuit 4; a print control circuit 6 for controlling motion of a carriage 11 on the basis of the image data memorized in the buffer 5; a mechanical control circuit 7 for mechanically controlling a paper feed motor (not shown), and so on; a motor drive circuit 8 for applying a drive voltage to the paper feed motor, and so on, on the basis of control signals output from the mechanical control circuit 7; a CPU (Central Processing Unit, which is control means) 9 for controlling respective elements in the digital multifunctional apparatus; a memory (serving as a memory means) 10 memorizing operating programs of the CPU 9 and various data required for the operation of the CPU 9; a print carriage (serving as a printing means) 11 for printing a print based on the image data memorized in the buffer 5 or the image data processed by the image processing circuit 4; and so on. The CPU 9 serving as a control means controls not only the respective elements as described above such as the image sensor 1, the image processing circuit 4 and the buffer 5, but also other elements such as the print carriage 11.

The above-described image data correction circuit 3, the image processing circuit 4, the print control circuit 6, the mechanical control circuit 7 and the CPU 9 are integrated into one-chip ASIC (Application-Specific Integrated Circuit) 12. Note that the CPU 9 used in this embodiment has an operating clock frequency of 48 MHz. The ASIC 12 further has, integrated therein, a timing generator 13 for outputting synchronizing signals to the image sensor 1 and the AFE 2, and also has a USB (Universal Serial Bus) device control circuit 14 which is connected via a USB cable to a host PC (personal computer) 20 connected to the digital multifunctional apparatus, and which functions as an interface to host PC 20.

The image sensor 1 is configured by a CCD (Charge Coupled Device) or a CIS (Contact Image Sensor) each having pixels aligned in a row, and so on. The image sensor 1 irradiates light onto a document, receives light reflected from the document so as to read image data for each line (for example, 5100 pixels), and converts the image data into electric signals. The image data correction circuit 3 performs black level correction for the image data output from the AFE 2, sensitivity correction for each pixel as well as level correction and gamma correction for each color of RGB (Red, Green and Blue). The image data corrected by the image data correction circuit 3 are output to alternatively of the image processing circuit 4 and the USB device control circuit 14 via a switch 15, switching operation of which is controlled by the CPU 9. More specifically, when the switch 15 is turned to the image processing circuit 4, the digital multifunctional apparatus can copy the image data of the document by itself. On the other hand, when the switch 15 is turned to the USB device control circuit 14, the image data output from the image data correction circuit 3 is transferred via the USB device control circuit 14 to the host PC 20.

Figure 2:
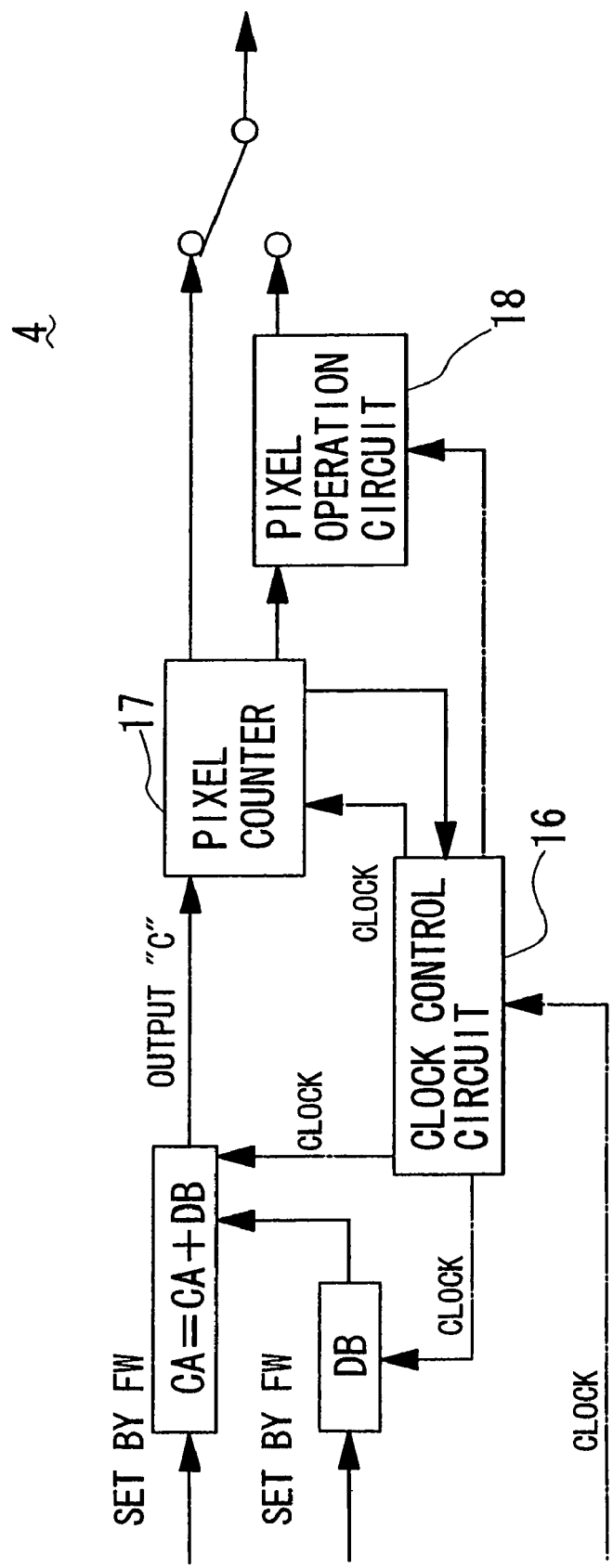
FIG. 2 is a block diagram showing a configuration of an image processing circuit of the digital multifunctional apparatus.

The image processing circuit 4 is configured by a hardware circuit (logic circuit) as shown in FIG. 2 described later, and enlarges or reduces the image data output from the image data correction circuit 3 for enlarging or reducing-the image based on the image data. The image data processed by the image processing circuit 4 is temporarily memorized in the buffer 5.

FIG. 3 shows examples of enlargement parameters in each area magnification (MAG), which are used as references for supplementing image data between adjacent pixels in one line, when enlarging of image is performed. A user inputs an area magnification percentage (MAG: %) by operating, for example, numeric input keys provided on the digital multifunctional apparatus or the like. Otherwise, it can be designed such that the CPU 9 automatically calculates the area magnification percentage (MAG) from the size of a document and the size of a printing paper designated by the user. In this embodiment, the area magnification percentages (MAG) can be set from 25% to 400% by a pitch of 1%, although the conversion table shown in FIG. 3 and a conversion table shown FIG. 4 described later show only a part of the range from 25% to 400%.

The CPU 9 converts an area enlargement ratio ($E_{ARE}$) obtained from an input area magnification percentage (MAG) into a length enlargement ratio ($E_{LEN}$). Thus, it can be said that the length enlargement ratio ($E_{LEN}$) is designated by the user inputting the area magnification percentage (MAG). This conversion from the area enlargement ratio ($E_{ARE}$) to the length enlargement ratio ($E_{LEN}$) is performed by firmware (FW) installed in the memory 10. The memory 10 memorizes the conversion tables necessary for the conversion. Normally, the length enlargement ratio ($E_{LEN}$) can be calculated by square root of the area enlargement ratio ($E_{ARE}$). However, in order to reduce the burden of the CPU 9, the present embodiment uses a linear approximation, more specifically an approximation to regard the length enlargement ratio ($E_{LEN}$) as varying linearly with the area enlargement ratio ($E_{ARE}$) as the length enlargement ratio ($E_{LEN}$) varies by every 0.1. The length enlargement ratio ($E_{LEN}$) calculated by the CPU 9 is output to the image processing circuit 4.

Referring to FIG. 2, at each clock input to a clock control circuit 16, the image processing circuit 4 multiplies a length enlargement ratio output from the CPU 9 by pixel numbers of an image read by the image sensor 1, in which the pixel numbers are counted from a starting pixel of the image reading, so as to calculate enlargement parameters for respective pixels. A pixel counter 17 counts integer portion C of each of the calculated enlargement parameters. When the counted integer portion C of the calculated enlargement parameter of a respective pixel increases by one "1", namely when the counted integer portion C of the calculated enlargement parameter of a respective pixel does not increase by at least two from that of the preceding pixel (corresponding to each non-shadowed column of the conversion table of FIG. 3), the image processing circuit 4 stores the image data of the respective pixel, as is, in the buffer 5.

On the other hand, when the counted integer portion C of the calculated enlargement parameter of a respective pixel increases by at least two from that of the preceding pixel (corresponding to each shadowed column of the conversion table of FIG. 3), a pixel operation circuit 18 supplements one image data between the respective pixel and the preceding pixel. The image processing circuit 4 stores the image data of the respective pixel and the supplemented image data in the buffer 5. Thus, the image processing circuit 4 stores, in the buffer 5, image data enlarged according to the area enlargement percentage input by a user. The mechanical control circuit 7 and the print control circuit 6 respectively control the motor drive circuit 8 and the print carriage 11 on the basis of the stored image data so as to print an enlarged image.

The above has described enlargement of an image in the direction of pixel alignment of the image sensor 1, that is, alignment direction of the imaging element, but can be similarly applied to enlargement of an image in a direction perpendicular to the direction of pixel alignment of the image sensor 1 (that is, enlargement in the direction of scanning lines of a document or of the image sensor 1 perpendicularly to the alignment direction of the imaging element). The enlargement of an image in the perpendicular direction can be done by multiplying a length enlargement ratio, output from the CPU 9, by line numbers of an image read by the image sensor 1, in which the line numbers are counted from a starting line of the image reading, so as to calculate enlargement parameters for respective lines.

FIG. 4 is shows examples of reduction parameters used as references for reducing image data for partially removing image data of pixels in one line, when reduction of image is performed. A user inputs an area reduction percentage (RED: %) in a manner similar to that described above for the area enlargement percentage. Otherwise, it can be designed such that the CPU 9 automatically calculates the area reduction percentage (RED) from the size of a document and the size of a printing paper designated by the user.

The CPU 9 converts an area reduction ratio ($R_{ARE}$) obtained from an input area reduction percentage (RED) into a length reduction ratio ($R_{LEN}$). Thus, it can be said that the length reduction ratio ($R_{LEN}$) is designated by the user inputting the area reduction percentage (RED). This conversion from the area reduction ratio ($R_{ARE}$) to the length reduction ratio ($R_{LEN}$) is performed by the firmware (FW) installed in the memory 10. Similarly as in the case of the image enlargement, this embodiment uses a linear approximation to regard the length reduction ratio ($R_{LEN}$) as varying linearly with the area reduction ratio as the length reduction ratio ($R_{LEN}$) varies by every 0.1. The length reduction ratio ($R_{LEN}$) calculated by the CPU 9 is output to the image processing circuit 4.

At each clock input to the clock control circuit 16, the image processing circuit 4 multiplies a length reduction ratio output from the CPU 9 by pixel numbers of an image read by the image sensor 1, in which the pixel numbers are counted from a starting pixel of the image reading, so as to calculate reduction parameters for respective pixels. The pixel counter 17 counts integer portion C of each of the thus calculated reduction parameters. When the counted integer portion C of the calculated reduction parameter of a respective pixel is unchanged from that of the preceding pixel (corresponding to each non-shadowed column of the conversion table of FIG. 4), the pixel operation circuit 18 removes the image data of the respective pixel.

On the other hand, when the counted integer portion C of the calculated reduction parameter of a respective pixel changes from that of the preceding pixel (corresponding to each shadowed column of the conversion table of FIG. 4), the image processing circuit 4 does not remove and stores the image data of the respective pixel in the buffer 5. Thus, the image processing circuit 4 memorizes, in the buffer 5, image data reduced according to the area reduction percentage (RED) input by a user. The mechanical control circuit 7 and the print control circuit 6 respectively control the motor drive circuit 8 and the print carriage 11 on the basis of the memorized image data so as to print a reduced image.

The above has described reduction of an image in the direction of pixel alignment of the image sensor 1, that is, alignment direction of the imaging element, but can be similarly applied to reduction of an image in a direction perpendicular to the direction of pixel alignment of the image sensor 1 (i.e. reduction in the direction of scanning lines of a document or of the image sensor 1 perpendicularly to the alignment direction of the imaging element). The reduction of an image in the perpendicular direction can be done by multiplying a length reduction ratio, output from the CPU 9, by line numbers of an image read by the image sensor 1, in which the line numbers are counted from a starting line of the image reading, so as to calculate reduction parameters for respective lines.

As described in the foregoing, according to the digital multifunctional apparatus of the present embodiment, the image processing circuit 4 is formed of a hardware circuit, so that it is possible that while reading image data of a document, the image processing circuit 4 can quickly enlarge or reduce the read image data for enlarging or reducing the image based on the image data without increasing the burden of the CPU 9. Thus, it is possible to use an inexpensive processor having a low operating clock frequency for the CPU 9, while reducing time required from reading of a document to printing, thereby making it possible to reduce the cost of the digital multifunctional apparatus. Moreover, it is possible to omit a CPU for scan control, a CPU for print control and a DSP for image processing, so that the cost of the digital multifunctional apparatus can be further reduced.

Furthermore, the image processing circuit 4 enlarges or reduces image data on the basis of enlargement parameters or reduction parameters calculated by a simple multiplication process so as to enlarge or reduce an image based on the image data, so that the circuit configuration of the image processing circuit 4 can be simplified, thereby still further reducing the cost of the digital multifunctional apparatus. In addition, the CPU 9 converts an area enlargement ratio and an area reduction ratio of an image into a length enlargement ratio and a length reduction ratio, respectively, so that a user is only required to input, to the digital multifunctional apparatus, an area enlargement ratio or an area reduction ratio according to a document or output paper, in order to be able to produce a print of a suitable size, thereby increasing user convenience.

The present invention is not limited to the structure, configuration or process of the above embodiment, and various modifications are possible. For example, the configuration of the image processing circuit 4 is not limited to that shown in FIG. 2, but can be a hardware circuit with another algorithm of enlargement and reduction different from that of the above embodiment. Furthermore, for converting the area enlargement ratio and the area reduction ratio to the length enlargement ratio and the length reduction ratio, respectively, it can be designed such that the CPU 9 calculates without using conversion tables such as shown in FIGS. 3 and 4. In addition, the printer function is not limited to that achieved by an inkjet printer, but can be that achieved by a laser printer.

This application is based on Japanese patent application 2004-140454 filed May 10, 2004 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A digital multifunctional imaging apparatus capable of copying a document independently, comprising:

an image sensor for irradiating light onto a document and receiving light reflected from the document so as to read image data of the document;

an image processor for processing the image data read by the image sensor so as to enlarge or reduce an image;

a printing mechanism for printing an image with using the image data processed by the image processor;

a single CPU (Central Processing Unit) for controlling the image sensor, the image processor and the printing mechanism; and a memory memorizing operating programs of the CPU, wherein the image processing means is configured by a hardware circuit while reading the image data of the document, the image processor quickly processes the read image data for enlarging or reducing an image to be printed without increasing burden of the control means, and wherein the CPU converts an area enlargement ratio input by a user into a length enlargement ratio by firmware installed in the memory using a linear approximation to regard the length enlargement ratio as varying linearly with the area enlargement ratio as the length enlargement ratio varies by every 0.1 and the calculated length enlargement ratio is output to the image processor;

for enlarging the image, the image processor calculates enlargement parameters for respective pixels or respective lines from a length enlargement ratio designated by a user and pixel numbers or line numbers of an image read by the image sensor, in which the pixel numbers or the line numbers are counted from a starting pixel or a starting line of the image reading, and supplements one image data between a respective pixel and the preceding pixel or between a respective line and the preceding line on the basis of the calculated enlargement parameter for the respective pixel or the respective line, so as to enlarge the image data; and for reducing the image, the image processing means calculates reduction parameters for respective pixels or respective lines from a length reduction ratio designated by a user and pixel numbers or line numbers of an image read by the image sensor, in which the pixel numbers or the line numbers are counted from a starting pixel or a starting line of the image reading, and removes image data on the basis of the calculated reduction parameter for the respective pixel or the respective line, so as to reduce the image data.

2. A digital multifunctional imaging apparatus capable of copying a document independently, comprising:

an image sensor for irradiating light onto a document and receiving light reflected from the document so as to read image data of the document for each line;

an image processing means for processing the image data read by the image sensor so as to enlarge or reduce the image data;

a buffer means for temporarily storing the image data enlarged or reduced by the image processing means;

a printing means for producing a print on the basis of the image data stored in the buffer means;

a control means for controlling the image sensor, the image processing means, the buffer means and the printing means; and a memory means memorizing an operating program of the control means and also storing a conversion table which the control means references, wherein the control means is configured by a single CPU (Central Processing Unit), referring the conversion table stored in the storage means, the control means converts an area enlargement ratio and an area reduction ratio input by a user to a length enlargement ratio and a length reduction ratio, respectively, using a linear approximation to regard the length enlargement ratio as varying linearly with the area enlargement ratio as the length enlargement ratio varies by every 0.1, and further outputs the converted length enlargement ratio and the converted length reduction ratio to the image processing means, the image processing means is formed of a hardware circuit, for enlarging the image, the image processing means multiplies a length enlargement ratio output from the control means by pixel numbers or line numbers of an image read by the image sensor, in which the pixel numbers or the line numbers are counted from a starting pixel or a starting line of the image reading, so as to calculate enlargement parameters for respective pixels or respective lines, when the counted integer portion of the calculated enlargement parameter of a respective pixel or a respective line increases by at least two from that of the preceding pixel or the preceding line, the image processing means supplements one image data between the respective pixel and the preceding pixel or between the respective line and the preceding line, in which the image processing means stores the image data of the respective pixel or the respective line and the supplemented image data in the buffer means, while the counted integer portion of the calculated enlargement parameter of the respective pixel or the respective line does not increase by at least two from that of the preceding pixel or the preceding line, the image processing means stores the image data of the respective pixel or the respective line, as is, in the buffer means, so as to enlarge the image data, and for reducing the image, the image processing means multiplies a length reduction ratio output from the control means by pixel numbers or line numbers of an image read by the image sensor, in which the pixel numbers or the line numbers are counted from a starting pixel or a starting line of the image reading, so as to calculate reduction parameters for respective pixels or respective lines, when the counted integer portion of the calculated reduction parameter of a respective pixel or a respective line is unchanged from that of the preceding pixel, the image processing means removes the image data of the respective pixel or the respective line, while the counted integer portion of the calculated reduction parameter of the respective pixel or the respective line changes from that of the preceding pixel or the preceding line, the image processing means stores the image data of the respective pixel or the respective line in the buffer means, so as to reduce the image data, whereby while reading the image data of the document, the image processing means quickly enlarges or reduces the read image data for printing without increasing burden of the control means.

* * * * *